(12) United States Patent
Watanabe et al.

(10) Patent No.: US 12,530,438 B2
(45) Date of Patent: Jan. 20, 2026

(54) MEDICAL INFORMATION MANAGEMENT SYSTEM HAVING A FUNCTION FOR ASSIGNMENT OF EDITING AUTHORITY ON SETTING INFORMATION IN A MODALITY, AND TERMINAL DEVICE AND STORAGE MEDIUM USED THEREIN

(71) Applicant: CANON MEDICAL SYSTEMS CORPORATION, Otawara (JP)

(72) Inventors: Yoshiteru Watanabe, Nasushiobara (JP); Shinya Ozawa, Saitama (JP); Takeshi Ishimoto, Arakawa (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 93 days.

(21) Appl. No.: 18/412,772

(22) Filed: Jan. 15, 2024

(65) Prior Publication Data
US 2024/0241930 A1    Jul. 18, 2024

(30) Foreign Application Priority Data
Jan. 13, 2023    (JP) .................. 2023-003773

(51) Int. Cl.
*G06F 21/31*    (2013.01)
*G16H 40/20*    (2018.01)

(52) U.S. Cl.
CPC ............. *G06F 21/31* (2013.01); *G16H 40/20* (2018.01)

(58) Field of Classification Search
CPC .................. G06F 21/31; G16H 40/20

USPC ............................................................ 726/18
See application file for complete search history.

(56) References Cited

U.S. PATENT DOCUMENTS

| | | | |
|---|---|---|---|
| 7,058,971 B1 | 6/2006 | Horikiri | |
| 2006/0058654 A1* | 3/2006 | Di Marco | A61B 8/00 600/437 |
| 2007/0282927 A1* | 12/2007 | Polouetkov | G06F 16/93 707/999.102 |
| 2010/0174674 A1* | 7/2010 | Unuma | G06F 3/0346 706/54 |
| 2011/0302414 A1* | 12/2011 | Logan | G16H 80/00 713/168 |
| 2013/0006112 A1* | 1/2013 | Vardy | A61B 5/0059 600/443 |
| 2014/0126770 A1* | 5/2014 | Odessky | G16H 30/20 382/103 |

(Continued)

FOREIGN PATENT DOCUMENTS

| | | |
|---|---|---|
| JP | 2001-101054 A | 4/2001 |
| JP | 2014-147608 A | 8/2014 |
| JP | 2022-1240 A | 1/2022 |

*Primary Examiner* — David P Zarka
(74) *Attorney, Agent, or Firm* — Oblon, McClelland, Maier & Neustadt, L.L.P.

(57) ABSTRACT

A medical information management device of an embodiment includes processing circuitry. The processing circuitry is configured to acquire patient authentication data for identifying a patient from a terminal device managed by a user, to authenticate that the patient is a user of a medical image diagnostic device on the basis of the patient authentication data, and to give the terminal device an editing authority to edit setting information on the patient set to examine the patient by the medical image diagnostic device on the basis of a result of the authentication.

8 Claims, 10 Drawing Sheets

(56) References Cited

U.S. PATENT DOCUMENTS

| | | | |
|---|---|---|---|
| 2015/0238150 A1* | 8/2015 | Subramaniam | G08B 21/0446 |
| | | | 340/539.11 |
| 2016/0321429 A1* | 11/2016 | Grashow | G06N 5/04 |
| 2017/0116384 A1* | 4/2017 | Ghani | G16H 70/20 |
| 2017/0319167 A1* | 11/2017 | Goto | A61B 6/5211 |
| 2018/0113984 A1* | 4/2018 | Doshi | G16H 20/40 |
| 2018/0308588 A1* | 10/2018 | Tate | G06F 21/6245 |
| 2019/0111299 A1* | 4/2019 | Radcliffe | A61H 1/0274 |
| 2020/0196916 A1* | 6/2020 | Chavakula | G16H 20/10 |
| 2021/0077860 A1* | 3/2021 | Posnack | A63B 24/0075 |
| 2021/0082066 A1* | 3/2021 | Puzder | G06Q 50/18 |
| 2021/0393223 A1* | 12/2021 | Kawajiri | A61B 6/54 |
| 2023/0181166 A1* | 6/2023 | Pagano | A61B 8/5223 |
| | | | 600/437 |

\* cited by examiner

FIG. 11

AUTHORITY MANAGEMENT TABLE

| PATIENT ID / TERMINAL ID | 000A | 000B | 000C | ... |
|---|---|---|---|---|
| 0001 | Y | | | |
| 0002 | X | X | | |
| 0003 | | | Y | |
| 0004 | Y | | X | |
| ⋮ | | | | |

X: EDITING AUTHORITY
Y: READING AUTHORITY

AUTHORITY MANAGEMENT TABLE

| PATIENT ID / TERMINAL ID | 000A | 000B | 000C |
|---|---|---|---|
| 0001 | Y→X | | |
| 0002 | X | X | |
| 0003 | Y | | Y |
| 0004 | | | X |

X: EDITING AUTHORITY
Y: READING AUTHORITY

AUTHORITY MANAGEMENT TABLE

| PATIENT ID / TERMINAL ID | 000A | 000B | 000C |
|---|---|---|---|
| 0001 | X | | |
| 0002 | Y | X | |
| 0003 | | | Y |
| 0004 | Y | | X |

X: EDITING AUTHORITY
Y: READING AUTHORITY

MEDICAL INFORMATION MANAGEMENT SYSTEM HAVING A FUNCTION FOR ASSIGNMENT OF EDITING AUTHORITY ON SETTING INFORMATION IN A MODALITY, AND TERMINAL DEVICE AND STORAGE MEDIUM USED THEREIN

CROSS-REFERENCE TO RELATED APPLICATION

The present application claims priority based on Japanese Patent Application No. 2023-003773 filed Jan. 13, 2023, the content of which is incorporated herein by reference.

FIELD

Embodiments disclosed in this specification and drawings relate to a medical information management device, a terminal device, a medical information management system, and a storage medium.

BACKGROUND

In recent years, there has been a technology by which a technician or an assistant (hereinafter, technician or the like) can remotely operate a medical image diagnostic device (hereinafter, as a modality) using a mobile terminal (tablet terminal) at a location away from the modality. Conventionally, one tablet terminal is associated with one modality, and a modality can only be operated using the associated tablet terminal. On the contrary, a technology by which modalities can be operated using a plurality of tablet terminals has been developed. By using this technology, a plurality of technicians or the like can carry tablet terminals and operate a plurality of modalities.

Under such circumstances, a plurality of technicians or the like can perform operations related to a plurality of modalities, for example, operations for registering information regarding a patient to be examined, using tablet terminals carried by them. Therefore, in order to prevent a modality different from a modality for which a patient has been scheduled to be examined from being operated, it is necessary to prevent a modality to be operated from being misidentified.

BRIEF DESCRIPTION OF THE DRAWINGS

FIG. 11 is a diagram showing an example of details of an authority management table.

DETAILED DESCRIPTION

Hereinafter, a medical information management device, a terminal device, a medical information management system, and a storage medium according to embodiments will be described with reference to the drawings.

A medical information management device of an embodiment includes processing circuitry. The processing circuitry is configured to acquire patient authentication data for identifying a patient from a terminal device managed by a user, to authenticate that the patient is a user of a medical image diagnostic device on the basis of the patient authentication data, and to give the terminal device an editing authority to edit setting information on the patient set to examine the patient by the medical image diagnostic device on the basis of a result of the authentication.

First Embodiment

Figure 1:
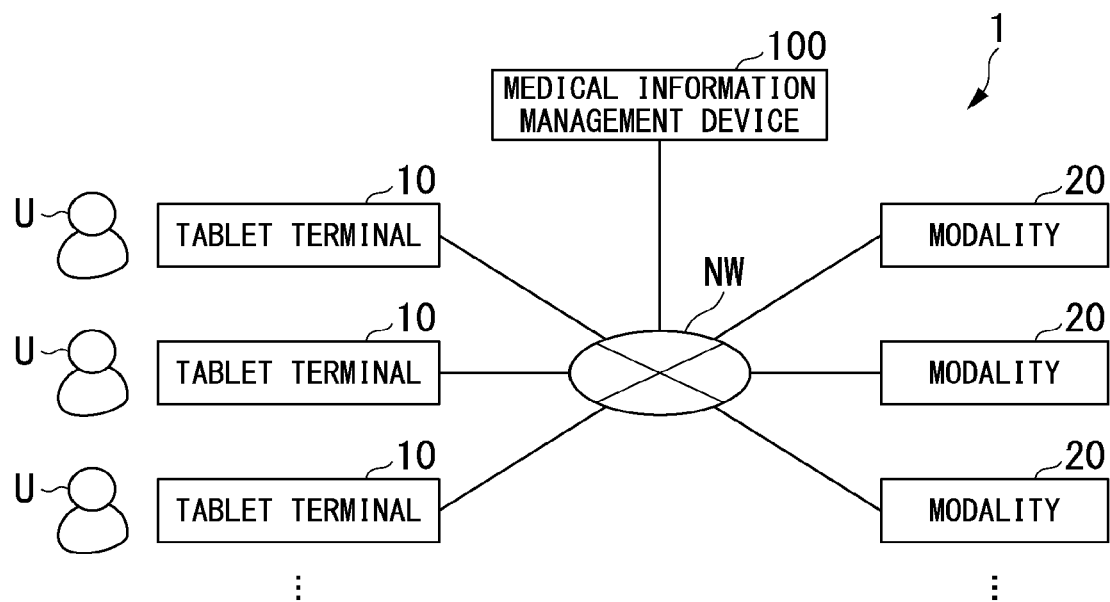
FIG. 1 is a block diagram showing an example of a configuration of a medical information management system 1 of a first embodiment.

FIG. 1 is a block diagram showing an example of a configuration of a medical information management system 1 of a first embodiment. The medical information management system 1 of the first embodiment includes, for example, a plurality of tablet terminals 10, a plurality of modalities 20, and a medical information management device 100. The plurality of tablet terminals 10, the plurality of modalities 20, and the medical information management device 100 can communicate with each other via a network NW. The network NW includes, for example, the Internet, a cellular network, a Wi-Fi network, and a wide area network (WAN). A terminal ID is assigned to each of the plurality of tablet terminals 10. Similarly, a device ID is assigned to each of the plurality of modalities 20.

Next, the tablet terminals 10 will be described. The tablet terminals 10 are distributed to a plurality of users U, respectively. Each user U manages the tablet terminal 10 distributed thereto. The tablet terminal 10 is a mobile terminal carried by each user U. A user ID is assigned to each user U. The tablet terminal 10 is an example of a terminal device.

The tablet terminal 10 may be used exclusively for the medical information management system 1 or may be a general-purpose tablet terminal in which an application program used for the medical information management system 1 is installed. A terminal device may be a terminal other than the tablet terminal, for example, a smartphone or the like.

One tablet terminal 10 is assigned to one user U, and users U manage assigned tablet terminals 10, respectively. Regarding the relationship between the tablet terminals 10 and users U, one tablet terminal 10 may be assigned to a plurality of users U, or a plurality of tablet terminals 10 may be assigned to one user U.

Figure 2:
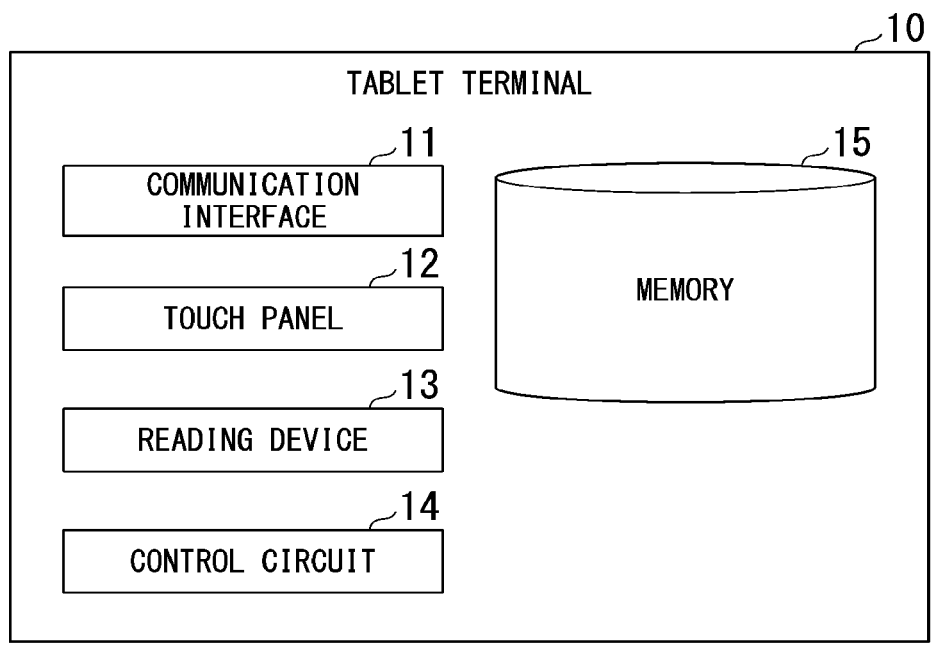
FIG. 2 is a block diagram showing an example of a configuration of a tablet terminal 10 of the first embodiment.

FIG. 2 is a block diagram showing an example of a configuration of the tablet terminal 10 of the first embodiment. The tablet terminal 10 includes, for example, a communication interface 11, a touch panel 12, a reading device 13, and a control circuit 14. The communication interface 11 communicates with the plurality of modalities 20 and the medical information management device 100 via a network NW such as a local area network (LAN), for example.

The touch panel 12 serves an input interface through which the user U inputs information and an output interface through which input information and the like are displayed. The touch panel 12 displays, for example, a graphical user interface (GUI) for receiving various input operations from the user U, and the like. The GUI includes, for example, one for the user U to remotely operate the modality 20. The touch panel 12 transmits information corresponding to a received input operation to the control circuit 14.

The reading device 13 reads, for example, patient authentication data for identifying a patient. The patient authentication data includes, for example, two-dimensional codes such as barcodes and QR codes (registered trademark) printed on a card held by the patient, information on the fingerprints, veins, face photograph, and iris of the patient, and the like. The reading device 13 outputs the read patient authentication data to the control circuit 14. The two-dimensional codes may indicate a patient ID.

The control circuit 14 controls each part of the tablet terminal 10. The control circuit 14 performs display control to display a GUI on the touch panel 12, for example. The control circuit 14 controls each part in the tablet terminal 10 on the basis of input information corresponding to an input operation received by the touch panel 12 or generates transmission information to be transmitted using the communication interface 11 to external devices such as the modality 20 and the medical information management device 100 on the basis of the input information. The control circuit 14 is an example of a control unit.

The communication interface 11 transmits patient authentication data read by the reading device 13 to the medical information management device 100. The communication interface 11 receives editing authority information that is transmitted by the medical information management device 100 and notifies of giving of editing authority to edit setting information on a target patient set in the medical information management device 100. The communication interface 11 is an example of a transmission unit and a reception unit.

The transmission information transmitted to the modality 20 includes, for example, registration information, comparison information, and editing information. The registration information is information for registering a patient to be examined (hereinafter, a target patient) in the modality 20. The modality 20 generates information set in the modality 20 (hereinafter, setting information) with respect to the target patient by acquiring registration information.

The setting information is generated for each target patient and includes a patient ID. In addition to the patient ID, the setting information includes information such as characteristics (physical characteristics such as sex, age, height, and weight, blood type, medical history, and the like) of the target patient, imaging conditions of the modality 20, and the like. The target patient is an example of a user of a medical image diagnostic device.

The comparison information is information for causing the modality 20 to compare a patient ID at the time of determining whether or not the tablet terminal 10 is given the authority to edit the setting information set in the modality 20 (hereinafter, editing authority). The comparison information includes a patient ID. The modality 20 compares the patient ID included in the transmitted comparison information with the patient ID included in the setting information set in the modality 20 to determine whether or not the tablet terminal 10 has an editing authority.

The editing information is information for editing the setting information generated by the modality 20. The modality 20 edits the setting information on the basis of the editing information by acquiring the editing information. The editing information includes, for example, editing items and edited details in the setting information. The setting information and the editing information each further include the patient ID of the target patient. The user U can remotely operate the plurality of modalities 20 by performing an input operation on the touch panel 12.

The control circuit 14 acquires patient authentication data output by the reading device 13. The control circuit 14 provides the acquired patient authentication data by transmitting it as transmission information to the medical information management device 100 using the communication interface 11, and requests authentication of the target patient corresponding to the patient authentication data.

The control circuit 14 acquires the patient ID transmitted by the medical information management device 100 that has authenticated the target patient. The control circuit 14 generates comparison information including the patient ID of the authenticated target patient and transmits the comparison information to the modality 20. The patient ID included in the comparison information is information for identifying the target patient who uses the modality 20 by being compared by the modality 20.

Figure 3:
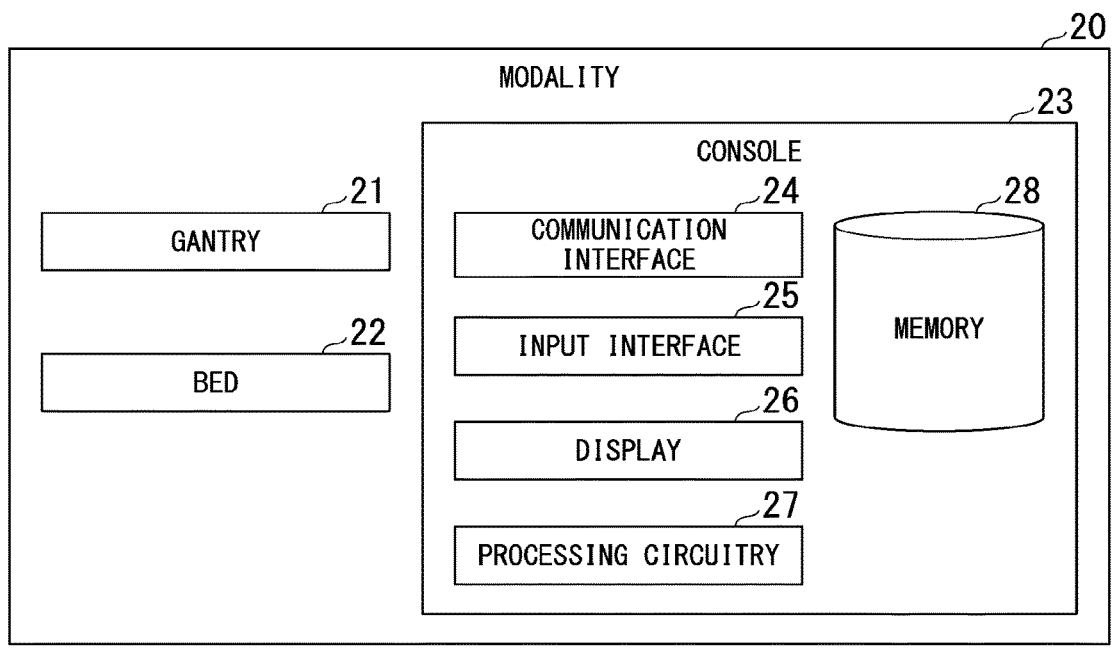
FIG. 3 is a block diagram showing an example of a configuration of a modality 20 of the first embodiment.

Next, the modality 20 will be described. FIG. 3 is a block diagram showing an example of a configuration of the modality 20 of the first embodiment. The modality 20 executes imaging (image-capturing) according to imaging conditions (imaging protocol) determined on the basis of an image examination instruction, for example. Examples of the modality 20 include an X-ray computed tomography device, an X-ray diagnostic device, a magnetic resonance imaging device, an ultrasound diagnostic device, a nuclear medicine diagnostic device, and the like.

The modality 20 includes, for example, a gantry 21, a bed 22, and a console 23. The gantry 21 is also called a gantry. The gantry 21 is provided with a device for capturing an image of a patient. For example, if the modality 20 is an X-ray tomography device, the device for capturing an image of a patient includes a radiation device (tube) for radiating X-rays, an X-ray detector for detecting X-rays, and the like. The gantry 21 outputs image information captured by the image-capturing device to the console 23.

The bed 22 includes, for example, a top plate on which a patient is mounted, and a drive mechanism that moves the top plate along a horizontal plane in a direction of moving away from or approaching the gantry 21 (hereinafter, a forward/backward direction) and in an up/down direction. The bed 22 moves a patient relative to the gantry 21 by moving the top plate in the forward/backward direction and in the up/down direction under the control of the control device.

The console 23 controls various devices provided on the gantry 21, designates output of equipment provided on the gantry 21, or generates images on the basis of information provided by the equipment provided on the gantry 21. The console 23 includes, for example, a communication interface 24, an input interface 25, a display 26, processing circuitry 27, and a memory 28.

The communication interface 24 includes a network interface card (NIC) or the like, and the network NW that communicates with external devices such as the tablet terminal 10 and the medical information management device 100 via a LAN may include the Internet, a cellular network, a Wi-Fi network, a WAN, or the like instead of or in addition to the LAN. The modality 20 receives information such as registration information, comparison information, and editing information transmitted by the tablet terminal 10 through the communication interface. The communication interface 24 converts the received information into an electrical signal and outputs the electrical signal to the processing circuitry 27.

The input interface 25 receives various input operations from an operator such as a user U or a doctor (radiologist). The input interface 25 converts information based on a received input operation, such as registration information and editing information, into an electrical signal and outputs the electrical signal to the processing circuitry 27. By performing various input operations on the input interface 25 of the console 23, the user U can generate setting information by registering an examination at the time of examining a target patient using the modality 20 or edit details of the setting information. In addition to using the console 23, the user U can also generate and edit setting information for the modality 20 using the tablet terminal 10 managed by the user U.

The display 26 is a liquid crystal display (LCD), a cathode ray tube (CRT) display, an organic electroluminescence (EL) display, or the like. The display 26 displays various types of information. The display 26 displays, for example, information generated by the processing circuitry 27, a GUI for receiving various input operations from an operator such as a user U, and the like. The display 26 when displaying the GUI also serves as the input interface 25.

The processing circuitry 27 processes various types of information on the basis of electrical signals output by the communication interface 24 and the input interface 25. The processing circuitry 27 performs examination registration for a target patient to generate setting information, for example, on the basis of registration information output from the communication interface 24 or the input interface 25.

For example, the processing circuitry 27 determines whether or not the modality 20 has setting information including a patient ID that matches a patient ID included in comparison information output by the communication interface 24. The processing circuitry 27 transmits the determination result to the tablet terminal 10 to which editing information has been transmitted using the communication interface 24. For example, the processing circuitry 27 edits setting information that matches the patient ID given to the editing information on the basis of the editing information output by the communication interface 24.

The processing circuitry 27 may edit the setting information that matches the patient ID given to the editing information on the basis of the editing information output by the input interface 25. The processing circuitry 27 realizes these functions by, for example, a hardware processor (computer) executing a program stored in the memory (storage circuit) 28.

The processing circuitry 27 generates a reconstructed image by performing reconstruction of image information output by the gantry 21, or the like. The processing circuitry 27 causes the display 26 to display the generated reconstructed image or transmits the generated reconstructed image to another external device or the like using the communication interface 24, for example.

The memory 28 is realized by, for example, a semiconductor memory such as a random access memory (RAM) or a flash memory, a hard disk, an optical disc, or the like. The memory 28 stores, for example, setting information and the like. Such data may be stored in an external memory with which modality 20 can communicate, instead of or in addition to the memory 28. The external memory is controlled by a cloud server, for example, when the cloud server that manages the external memory receives a read/write request.

Figure 4:
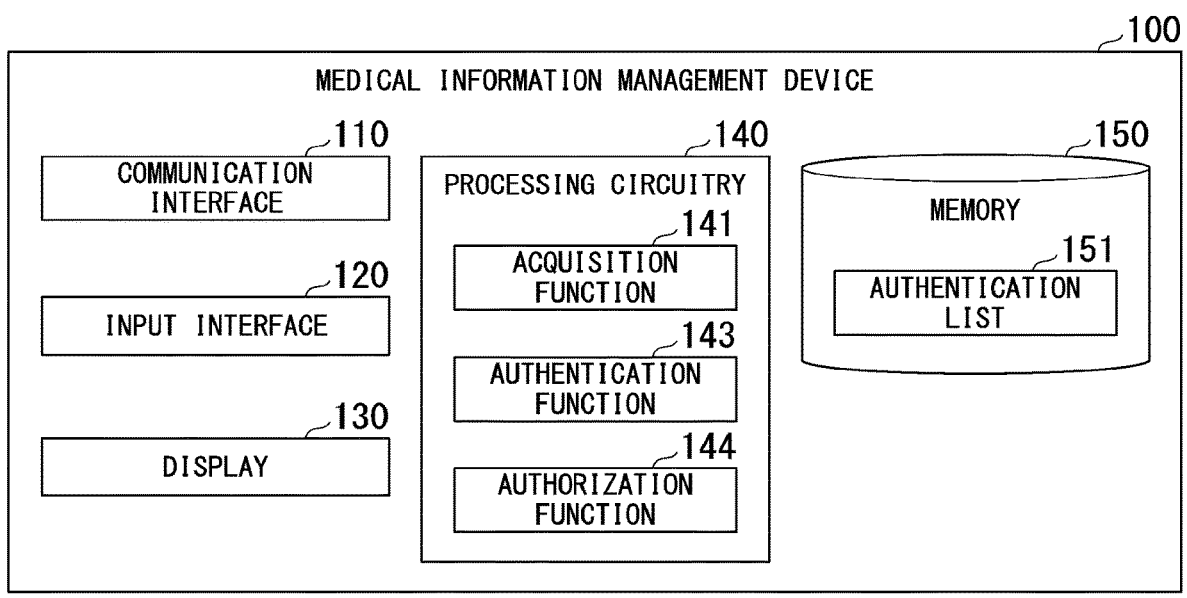
FIG. 4 is a block diagram showing an example of a configuration of a medical information management device 100 of the first embodiment.

Next, the medical information management device 100 will be described. FIG. 4 is a block diagram showing an example of a configuration of the medical information management device 100 of the first embodiment. The medical information management device 100 includes, for example, a communication interface 110, an input interface 120, a display 130, processing circuitry 140, and a memory 150. The communication interface 110 communicates with the tablet terminal 10 and the modality 20 via a network NW, for example. The communication interface 110 includes, for example, a communication interface such as a NIC.

The input interface 120 receives various input operations from the user U, a practitioner, and the like, converts the received input operations into electrical signals, and outputs the electrical signals to the processing circuitry 140. The input interface 120 includes, for example, a mouse, a keyboard, a trackball, a switch, a button, a joystick, a touch panel, and the like. The input interface 120 may be, for example, a user interface that receives voice input, such as a microphone. In a case in which the input interface 120 is a touch panel, the input interface 120 may also have the display function of the display 130.

Note that in this specification, the input interface is not limited to one that includes physical operation parts such as a mouse and a keyboard. For example, examples of the input interface include electrical signal processing circuitry that receives an electrical signal corresponding to an input operation from external input equipment provided separately from the device and outputs this electrical signal to a control circuit.

The display 130 displays various types of information. For example, the display 130 displays images generated by the processing circuitry 140, a GUI for receiving various input operations from an operator or the like, and the like. For example, the display 130 is an LCD, a CRT display, an organic EL display, or the like.

The processing circuitry 140 includes, for example, an acquisition function 141, an authentication function 142, and an authorization function 143. The processing circuitry 140 realizes these functions by, for example, a hardware processor (computer) executing a program stored in the memory (storage circuit) 150.

The hardware processor means, for example, circuitry such as a CPU, a graphics processing unit (GPU), an application specific integrated circuit (ASIC), a programmable logic device (for example, a simple programmable logic device (SPLD) or a complex programmable logic device (CPLD)), or a field programmable gate array (FPGA).

Instead of storing the program in the memory 150, the program may be directly incorporated into the circuit of the hardware processor. In this case, the hardware processor realizes the functions by reading and executing the program incorporated into the circuit. The above program may be stored in advance in the memory 150, or may be stored in a non-transitory storage medium such as a DVD or a CD-ROM and installed to the memory 150 from the non-transitory storage medium when the non-transitory storage medium is set in a drive device (not shown) of the medical information management device 100.

The hardware processor is not limited to being configured as a single circuit and may be configured as a single hardware processor by combining a plurality of independent circuits to realize each function. Further, a plurality of components may be integrated into one hardware processor to realize each function. Although the hardware processor, the memory, and the like in the medical information management device 100 are provided separately from a hardware processor, a memory, and the like in the HIS 30, they may be common.

The memory 150 is realized by, for example, a read only memory (ROM), a random access memory (RAM), a semiconductor memory element such as a flash memory, a hard disk drive (HDD), an optical disc, or the like. The memory 150 stores an authentication list 151. The authentication list 151 is, for example, a list of relationships between patient authentication data and patient IDs of a plurality of registered patients.

The acquisition function 141 acquires various types of information transmitted by the tablet terminal 10 and the modality 20. The acquisition function 141 acquires, for example, patient authentication data transmitted and provided by the tablet terminal 10 managed by the user U. The acquisition function 141 is an example of an acquisition unit.

The authentication function 142 refers to the authentication list 151 stored in the memory 150 for the patient authentication data acquired by the acquisition function 141. Accordingly, the authentication function 142 performs authentication processing for the target patient whose authentication is requested by the tablet terminal 10 on the basis of the patient authentication data acquired by the acquisition function 141. The authentication function 142 is an example of an authentication unit.

The authorization function 143 gives an editing authority to edit setting information on the target patient corresponding to the authenticated patient ID to the tablet terminal 10 on the basis of the result of authentication by the authentication function 142. In a case in which the authentication function 142 has authenticated a target patient on the basis of patient authentication data that does not include a patient ID, the authorization function 143 issues a patient ID corresponding to the authenticated patient and adds the patient ID to editing authority information. Instead of or in addition to the patient ID, the editing authority information may include an examination ID assigned to each examination for the target patient.

The authorization function 143 gives the editing authority to the tablet terminal 10 that has transmitted the patient authentication data in a case in which the target patient has been authenticated by the authentication function 142. In this case, the authorization function 143 transmits the editing authority information to the tablet terminal 10 using the communication interface 110.

The authorization function 143 transmits denial information to the tablet terminal 10 using the communication interface 110 in a case in which the target patient has not been authenticated by the authentication function 142. The modality 20 edits setting information on the target patient having the matching patient ID on the basis of editing information transmitted by the tablet terminal 10 to which the editing authority has been given. The authorization function 143 is an example of an authorization unit.

Figure 5:
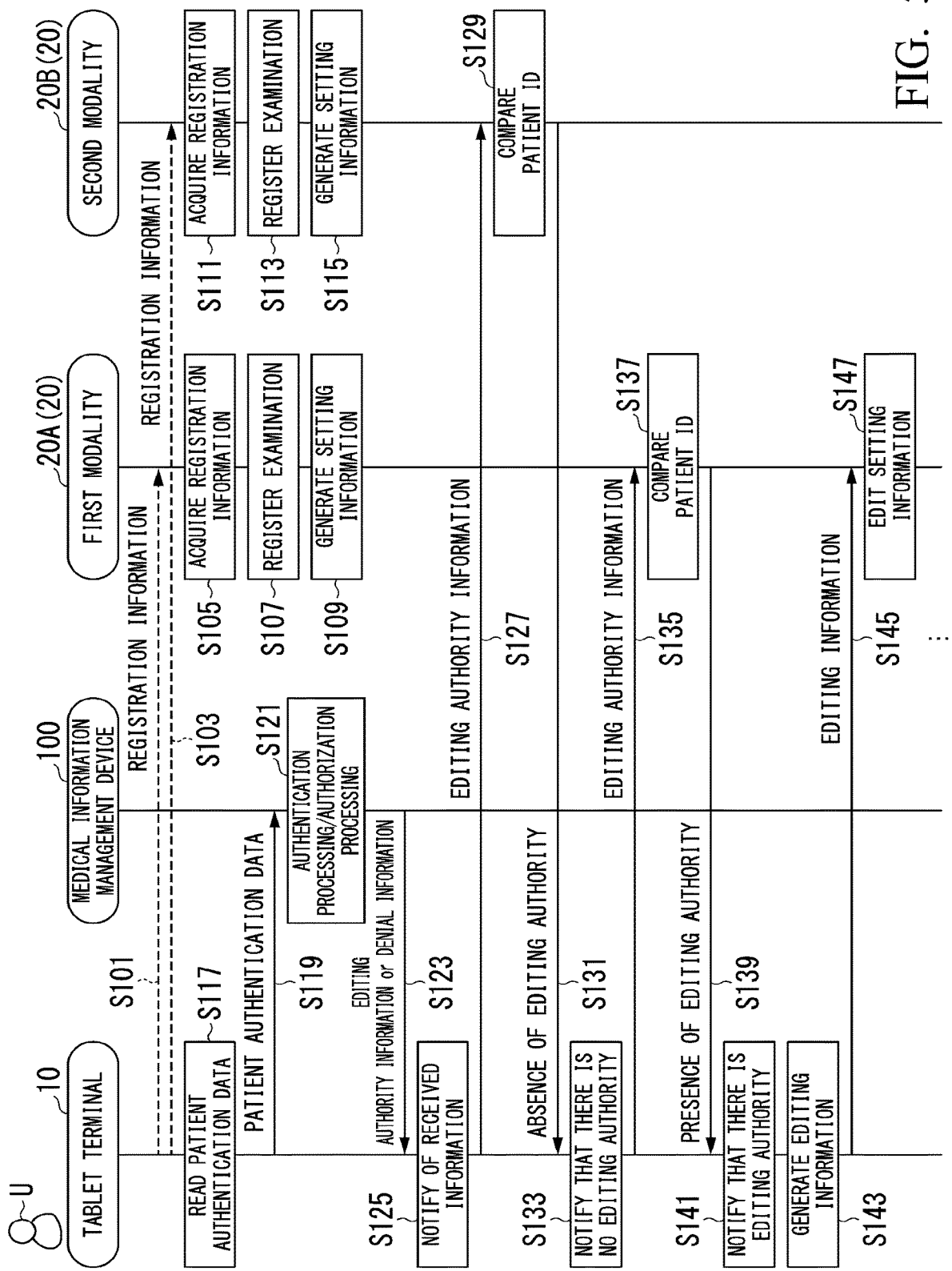
FIG. 5 is a sequence diagram showing an example of processing in the medical information management system 1 of the first embodiment.

Next, processing in the medical information management system 1 of the first embodiment will be described. FIG. 5 is a sequence diagram showing an example of processing in the medical information management system 1 of the first embodiment. In this example, it is assumed that patients can be examined using a first modality 20A and a second modality 20B, and a target patient is examined using the first modality 20A. Although a patient to be examined by the second modality 20B is a target patient when viewed from the second modality 20B, he or she will be described as another patient.

In the medical information management system 1 of the first embodiment, first, the tablet terminal 10 transmits registration information on the target patient to the first modality 20A (step S101) and transmits registration information on other patients to the second modality 20B (step S103). The first modality 20A acquires the registration information on the target patient (step S105), performs examination registration for the target patient (step S107), and generates setting information for examining the target patient (step S109).

The second modality 20B acquires the registration information on other patients (step S111), performs examination registration for other patients (step S113), and generates setting information for examining other patients (step S115). Although the registration information acquired by the first modality 20A and the second modality 20B is both transmitted by the tablet terminal 10, the registration information may be input through the input interface 25 in each of the first modality 20A and the second modality 20B. In this case, processing in step S101 and step S103 is omitted.

Until setting information is generated in the first modality 20A and the second modality 20B, the tablet terminal 10 reads patient authentication data using the reading device 13 (step S117) and transmits the read patient authentication data to the medical information management device 100 (step S119). The medical information management device 100 that has received the patient authentication data performs authentication processing and authorization processing (step S121). Hereinafter, the procedure of authentication processing and authorization processing in the medical information management device 100 will be described.

Figure 6:
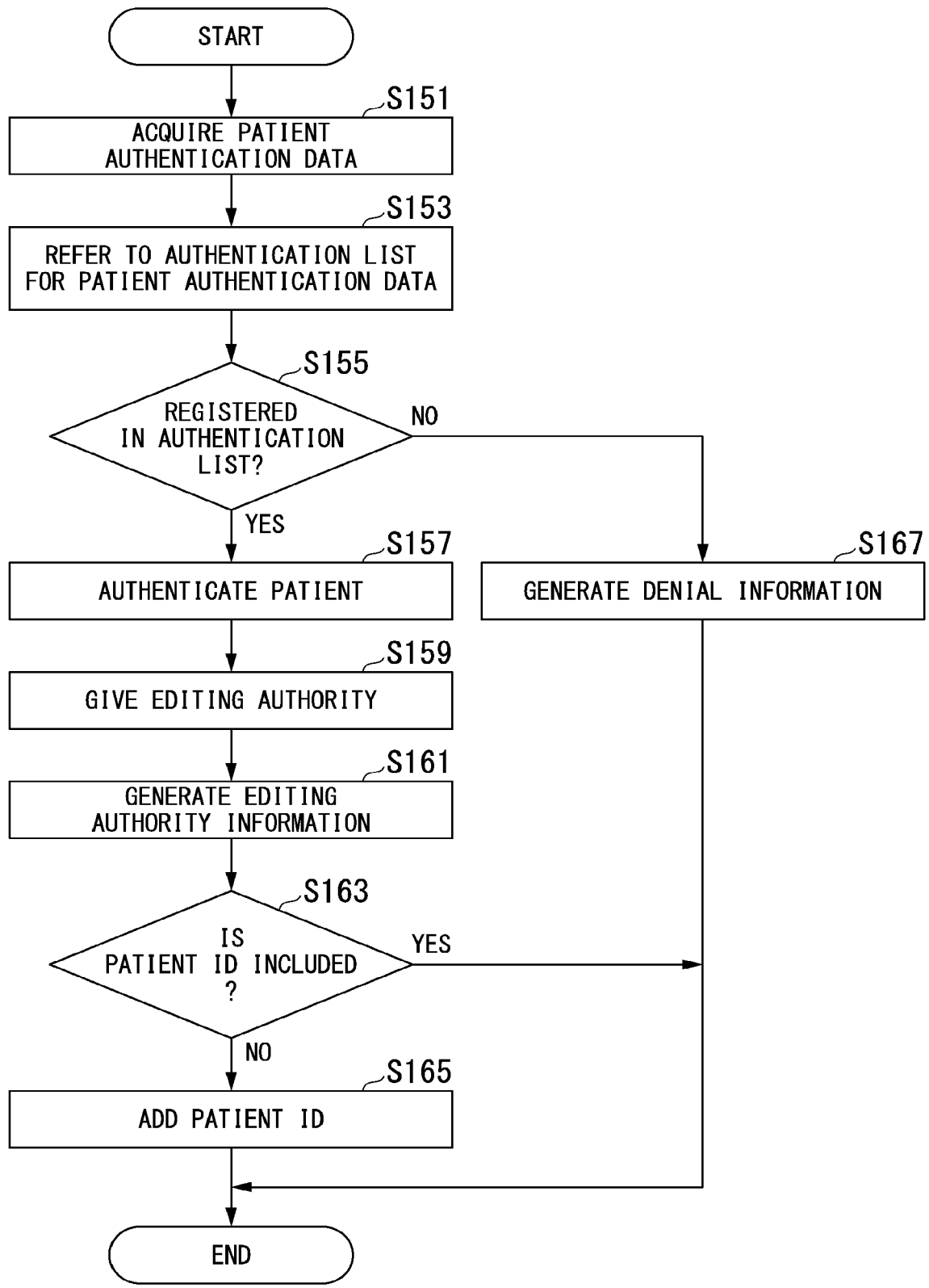
FIG. 6 is a flowchart showing an example of processing in the medical information management device 100 of the first embodiment.

FIG. 6 is a flowchart showing an example of processing in the medical information management device 100 of the first embodiment. In the medical information management device 100, the acquisition function 141 acquires patient authentication data transmitted by the tablet terminal 10 (step S151). Subsequently, the authentication function 142 refers to the authentication list 151 stored in the memory 150 for the patient authentication data acquired by the acquisition function 141 (step S153) and determines whether or not the patient authentication data is a patient authentication data of a patient registered in the authentication list 151 (step S155).

If it is determined that the patient authentication data is patient authentication data of a patient registered in the authentication list 151, the authentication function 142 authenticates the patient corresponding to the patient authentication data as a target patient (step S157). Subsequently, the authorization function 143 gives an editing authority to the tablet terminal 10 that has transmitted the patient authentication data (step S159) and generates editing authority information for notifying of giving of the editing authority (step S161).

Subsequently, the authorization function 143 determines whether or not the patient authentication data includes a patient ID (step S163). If it is determined that the patient authentication data does not include a patient ID, the authorization function 143 issues a patient ID with reference to the authentication list 151 and adds the issued patient ID to the editing authority information (step S165). In this manner, the medical information management device 100 ends processing shown in FIG. 6.

If the authorization function 143 determines that the patient authentication data includes a patient ID, the medical information management device 100 ends processing shown in FIG. 6. In step S155, if the authentication function 142 determines that the patient authentication data is not patient authentication data of a patient registered in the authentication list 151, the authentication function 142 generates denial information (step S167). In this manner, the medical information management device 100 ends processing shown in FIG. 6.

Referring back to FIG. 5, the medical information management device 100 transmits the generated editing authority information or denial information to the tablet terminal 10 that has transmitted the patient authentication data using the communication interface 110 (step S123). When the tablet terminal 10 has received the editing authority information or the denial information, the tablet terminal 10 notifies the user U of the received information by displaying the received information on the display 26, or the like (step S125).

The user U receives the notification from the tablet terminal 10 and recognizes whether or not the editing authority has been given. In a case in which the patient ID is not added to the received editing authority information, the patient ID has been read by the reading device 13, and thus the tablet terminal 10 converts the patient ID read by the reading device 13 into the editing authority information.

Subsequently, the tablet terminal 10 sequentially transmits the editing authority information including the patient ID to the plurality of modalities 20 according to operation of the user U and edits the setting information on the target patient set in the modality 20 to be used by the target patient. Therefore, the tablet terminal 10 first transmits the editing authority information to the second modality 20B, for example (step S127).

The second modality 20B compares the patient ID included in the editing authority information transmitted by the tablet terminal 10 with the patient ID of the patient registered for examination (step S129). Since examination registration for the target patient is not performed in the second modality 20B, it is determined that the editing authority given to the tablet terminal 10 is not the authority to edit the setting information on the second modality 20B as a result of comparison. The second modality 20B transmits information indicating that there is no editing authority to the tablet terminal 10 as a result of comparison (step S131).

The tablet terminal 10 notifies the user U of the received information indicating there is no editing authority by displaying the information on the display 26, or the like (step S133). The user U receives the notification from the tablet terminal 10 and operates the tablet terminal 10 to transmit the editing authority information to another modality 20, in this case, the first modality 20A.

The tablet terminal 10 transmits the editing authority information to the first modality 20A according to the operation of the user U (step S135). The first modality 20A compares the patient ID included in the editing authority information transmitted by the tablet terminal 10 with the patient ID of the patient registered for examination (step S137).

Since examination registration for the target patient is performed in the first modality 20A, the first modality 20A determines that the editing authority given to the tablet terminal 10 is the authority to edit the setting information of the first modality 20A as a result of comparison. The first modality 20A transmits editing authority information indicating that there is an editing authority to the tablet terminal 10 as a result of comparison (step S139).

The tablet terminal 10 notifies the user U of the received information indicating that there is an editing authority by displaying the information on the display 26, or the like (step S141). The user U receives the notification from the tablet terminal 10 and operates the tablet terminal 10 to edit the setting information of the first modality 20A.

The tablet terminal 10 generates editing information in response to the operation of the user U (step S143) and transmits the generated editing information to the first modality 20A (step S145). The first modality 20A edits the setting information on the target patient on the basis of the editing information transmitted from the tablet terminal 10 (step S147). In this manner, the medical information management system 1 ends the sequence shown in FIG. 5.

The medical information management system 1 of the first embodiment authenticates a target patient whose setting information is to be edited using the tablet terminal 10 managed by the user U in the medical information management device 100. Since it is impossible to edit setting information for a patient who has not been registered for examination, it is possible to prevent a modality 20 to be operated from being misidentified.

Second Embodiment

Figure 7:
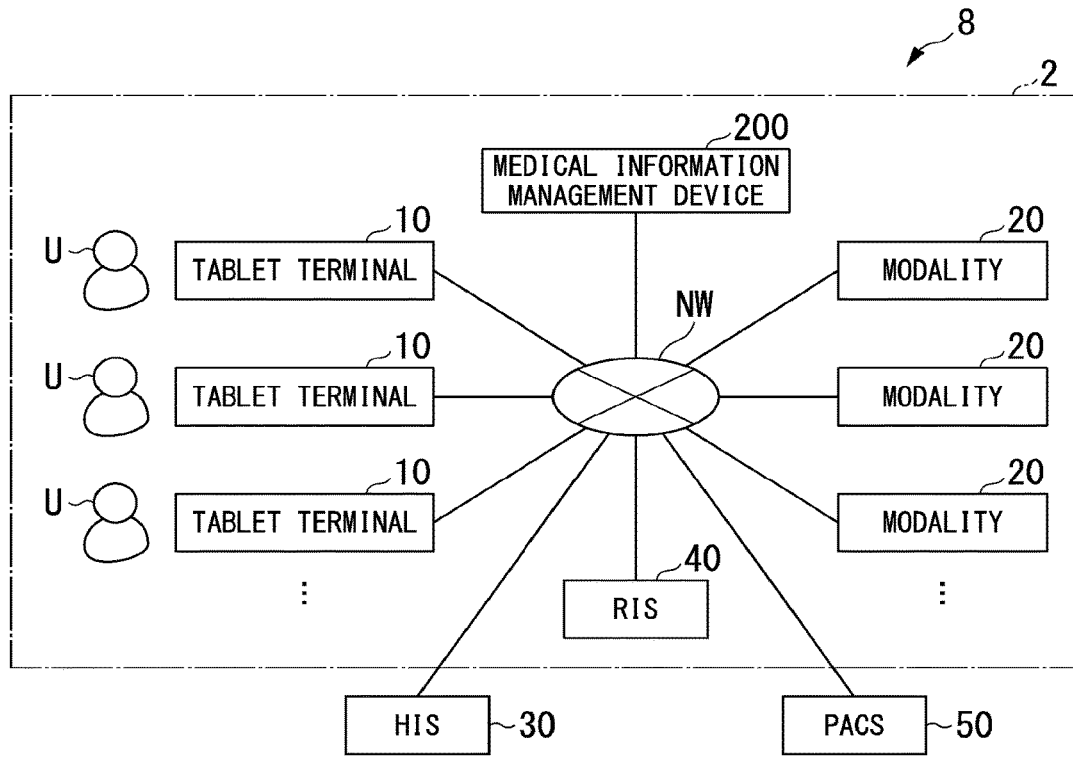
FIG. 7 is a block diagram showing an example of a configuration of an in-hospital system 8 including a medical information management system 2 of a second embodiment.

Next, a second embodiment will be described. FIG. 7 is a block diagram showing an example of a configuration of an in-hospital system 8 including a medical information management system 2 of the second embodiment. The medical information management system 2 of the second embodiment is incorporated into a part of the in-hospital system 8. The in-hospital system 8 including the medical information management system 2 of the second embodiment differs from the first embodiment in that it includes a hospital information system (hereinafter, HIS) 30, a radiology information system (hereinafter, RIS) 40, a picture archiving and communication system (PACS) 50, and a medical information management device 200 in addition to a plurality of tablet terminals 10 and a plurality of modalities 20, for example. Furthermore, the medical information management device 200 differs from the first embodiment in that it includes a selection function 244. In the following description of the second embodiment, elements common to the first embodiment may be denoted by the same numbers and detailed descriptions thereof may be omitted.

The HIS 30 is a computer system that supports works within the hospital. Specifically, the HIS 30 has various subsystems. Various subsystems include, for example, an electronic medical record system, a medical accounting system, a medical reservation system, a hospital visit reception system, and an admission/discharge management system. The HIS 30 includes, for example, a computer such as a server device or a client terminal that includes a processor such as a central processing unit (CPU), a memory such as a ROM or a RAM, a display, an input interface, and a communication interface.

A user U inputs or refers to information regarding a patient using the electronic medical record system included in the HIS 30. The user U issues an image examination order to the HIS 30. The HIS 30 transfers order information corresponding to the image examination order to other systems such as the RIS 40.

The RIS 40 is a computer system that supports works in an image diagnosis department. The RIS 40 manages work schedules of users U and the modalities 20. The work schedules include patient IDs and device IDs. The RIS 40 determines a user U who will be in charge of an image examination and a modality 20 to be used for the image examination on the basis of the issued image examination order. The RIS 40 manages the work schedules of the users U and the modalities 20, including the determined details. The HIS 30 transmits the work schedules of the users U and the modalities 20 to the medical information management device 200 via the network NW in response to a request from the medical information management device 200. The RIS 40 is an example of a schedule management device.

The RIS 40 performs association of reservation information with examination equipment (modality 20), management of examination information, and the like in addition to image examination order reservation management in association with the HIS 30. The RIS 40 includes, for example, a computer such as a server device or a client terminal that includes a processor such as a CPU, a memory such as a ROM or a RAM, a display, an input interface, and a communication interface.

The PACS 50 is a computer system that receives medical images transmitted by modalities 20 and stores the medical images in a database. The PACS 50 transmits (transfers) medical images stored in the database in response to a request from a client. The PACS 50 includes a server computer including a processor such as a CPU, a memory such as ROM and RAM, a display, an input interface, and a communication interface. Medical images stored in the PACS 50 are accompanied by information regarding patients to be imaged and imaging as supplementary information. The supplementary information includes information such as a patient ID, an examination ID, and imaging conditions (imaging protocol) in a format that complies with the Digital Imaging and Communication in Medicine (DICOM) standard, for example.

The configuration of the in-hospital system 8 is not limited to the above. The in-hospital system 8 may include, for example, an image interpretation report creation device and the like. Moreover, some elements of the in-hospital system 8 may be integrated. For example, the HIS 30 and the RIS 40 may be integrated into one system.

Figure 8:
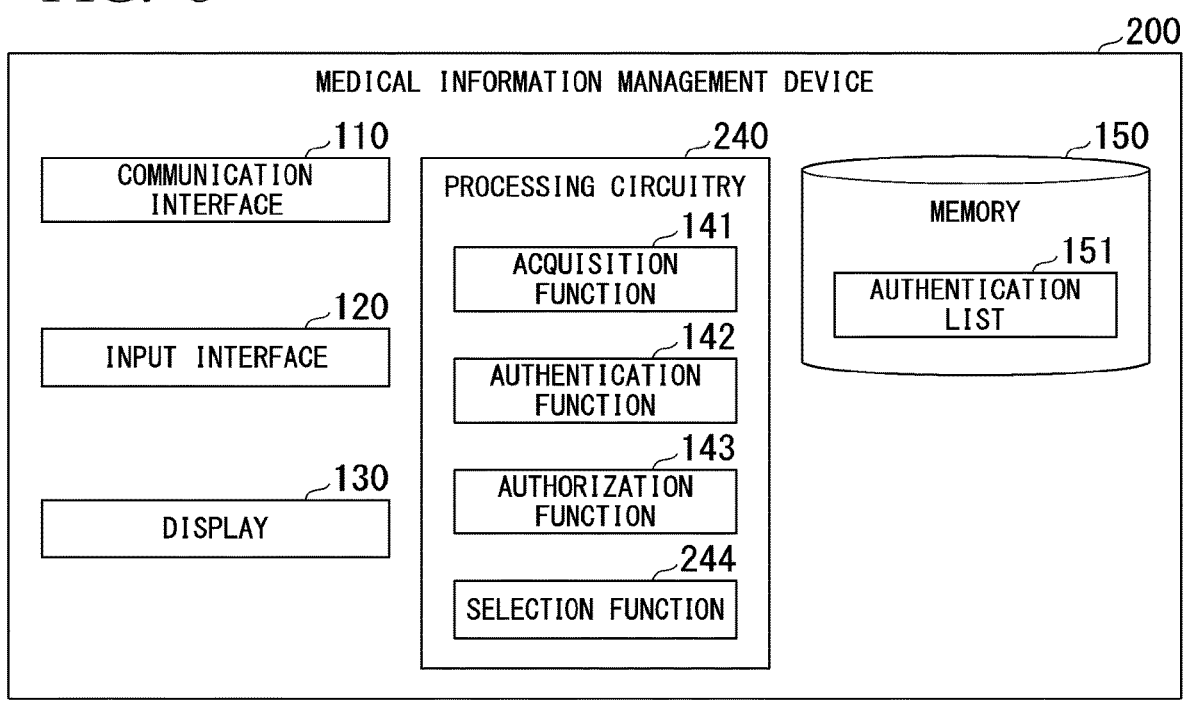
FIG. 8 is a block diagram showing an example of a configuration of a medical information management device 200 of the second embodiment.

FIG. 8 is a block diagram showing an example of a configuration of the medical information management device 200 of the second embodiment. Processing circuitry 240 in the medical information management device 200 of the second embodiment includes the selection function 244. Other components of the medical information management device 200 are common to the medical information management device 100 of the first embodiment.

The selection function 244 selects a modality 20 to be used to examine a specific patient from among the plurality of modalities 20. The selection function 244 selects a modality 20 to be used to examine a target patient on the basis of the characteristics and schedule of the target patient and the performance and work schedule of the modality 20, for example. The selection function 244 is an example of a selection unit.

Figure 9:
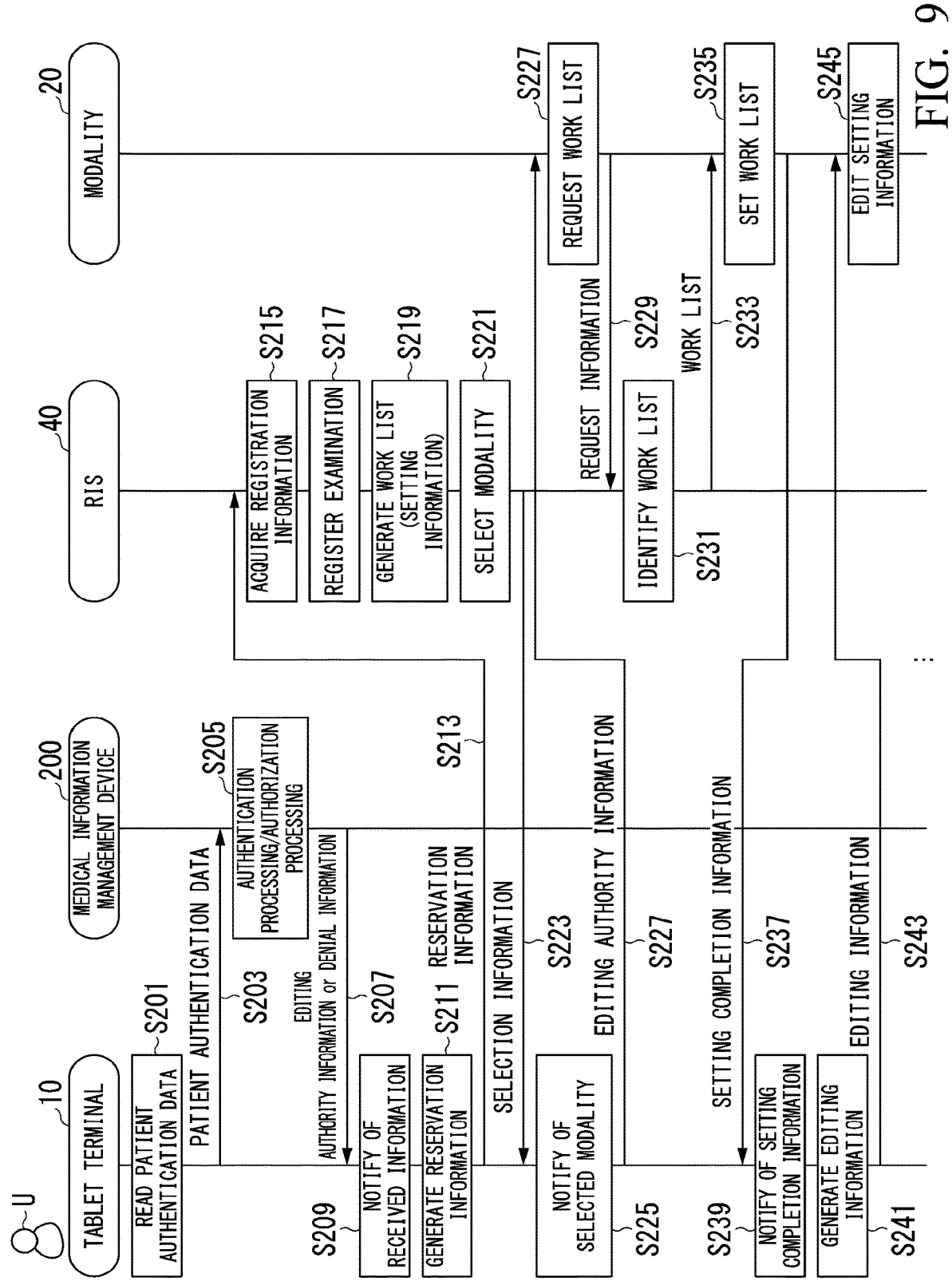
FIG. 9 is a sequence diagram showing an example of processing in the medical information management system 2 of the second embodiment.

Next, processing of the medical information management system 2 of the second embodiment will be described. FIG. 9 is a sequence diagram showing an example of processing in the medical information management system 2 of the second embodiment. In the medical information management system 2 of the second embodiment, the tablet terminal 10 first reads patient authentication data using the reading device 13 (step S201) and transmits the read patient authentication data to the medical information management device 100 (step S203). The medical information management device 200 that has received the patient authentication data performs authentication processing and authorization processing (step S205). The authentication processing and authorization processing are the same as those in the first embodiment.

Subsequently, the medical information management device 100 transmits generated editing authority information or denial information to the tablet terminal 10 that has transmitted the patient authentication data using the communication interface 110 (step S207). The tablet terminal 10 notifies the user U of the received editing authority information or denial information (step S209), and the user U receives the notification from the tablet terminal 10 and recognizes whether or not the editing authority has been given. Processing of the tablet terminal 10 here is also common to the first embodiment.

Subsequently, the tablet terminal 10 generates reservation information for reservation of an examination for a target patient (step S211). The tablet terminal 10 generates the reservation information on the basis of an operation of the user U through the input interface 25, for example. The reservation information includes registration information, comparison information (patient ID), and setting information. The tablet terminal 10 transmits the generated reservation information to the RIS 40 (step S213).

The RIS 40 acquires registration information on the target patient on the basis of the reservation information transmitted by the tablet terminal 10 (step S215), and then performs examination registration for the target patient (step S217). The RIS 40 generates a work list including setting information for examination of the target patient (step S219). The RIS 40 selects a modality 20 that can execute a generated workflow on the basis of performances and work schedules of the plurality of modalities 20 through the selection function 244 (step S221). The RIS 40 generates selection information based on the selected modality 20 and transmits the selection information to the tablet terminal 10 (step S223). The selection information includes the device ID of the selected modality 20.

The tablet terminal 10 notifies the user U of the received selection information by displaying the selection information on the display 26, or the like (step S225). The user U receives the notification from the tablet terminal 10 and confirms the device ID of the modality 20 used for the examination. Subsequently, the tablet terminal 10 transmits editing authority information to the modality 20 to which the device ID confirmed by the user U is attached (step S227).

The modality 20 that has received the editing authority information transmits request information for requesting a work list for executing examination of a patient ID (or examination ID) added to the editing authority information to the RIS 40 (step S229). Subsequently, the RIS 40 identifies the work list corresponding to the patient ID (step S231) and transmits the identified work list to the modality 20 that has transmitted the request information (step S233). The modality 20 sets the work list transmitted by the RIS 40 (step S235).

Subsequently, the modality 20 generates setting completion information indicating that setting of the work list is completed and transmits the setting completion information to the tablet terminal 10 (step S237). The tablet terminal 10 notifies the user U of the received setting completion information by displaying the setting completion information on the display 26, or the like (step S239). The user U receives the notification from the tablet terminal 10 and operates the tablet terminal 10 to edit the setting information of the modality 20.

The tablet terminal 10 generates editing information in response to the operation of the user U (step S241) and transmits the generated editing information to the modality 20 (step S243). The modality 20 edits the setting information on the target patient on the basis of the editing information transmitted from the tablet terminal 10 (step S245). In this manner, the medical information management system 2 ends the sequence shown in FIG. 9.

The medical information management system 2 of the second embodiment has the same effects as the medical information management system 1 of the first embodiment. Furthermore, the medical information management system 2 of the second embodiment selects a modality 20 that can execute a workflow on the basis of reservation information transmitted by the tablet terminal 10 in the RIS 40. Therefore, a modality 20 that can be used by a patient can be easily selected, and work schedules of a plurality of patients and modalities 20 can be easily managed. In addition, since the modality 20 can request a work list from the RIS 40, an examination registration work in the modality 20 can be easily completed.

Third Embodiment

Next, a third embodiment will be described. A medical information management system of the third embodiment has the same configuration as the medical information management system 2 of the second embodiment and can execute the same processing as the medical information management system 2. The medical information management system of the third embodiment can execute processing described below in addition to the processing of the medical information management system 2 of the second embodiment. The third embodiment will be described below, focusing on the processing of the medical information management system of the third embodiment in addition to the processing of the medical information management system 2 of the second embodiment.

Figure 10:
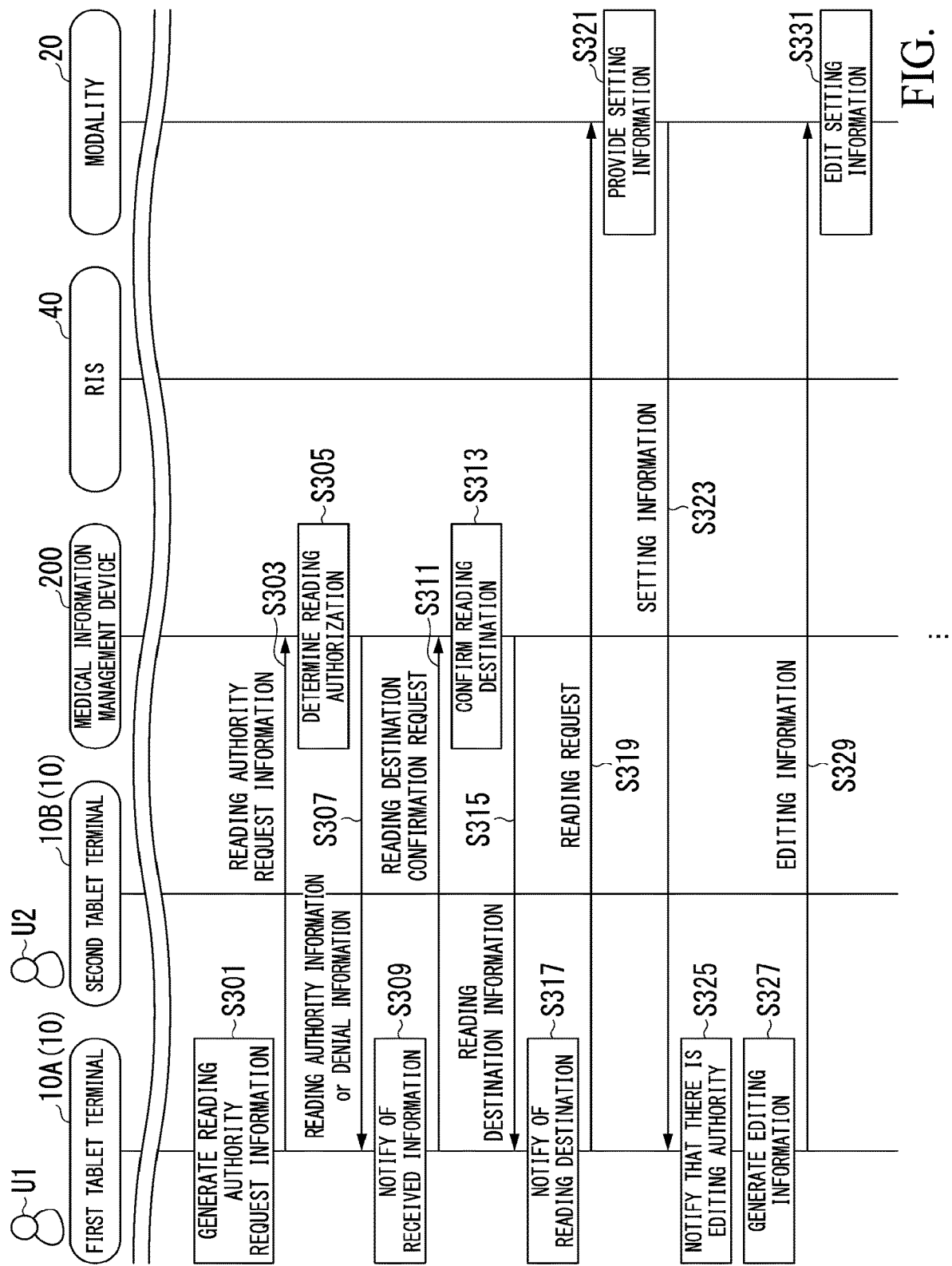
FIG. 10 is a sequence diagram showing an example of processing in a medical information management system of a third embodiment.

FIG. 10 is a sequence diagram showing an example of processing in the medical information management system of the third embodiment. The medical information management system of the third embodiment includes a first tablet terminal 10A and a second tablet terminal 10B as tablet terminals 10 and includes a medical information management device 200, an RIS 40, and a modality 20. The first tablet terminal 10A is managed by a first user U1, and the second tablet terminal 10B is managed by a second user U2. In the sequence diagram shown in FIG. 10, the second tablet terminal 10B corresponds to the tablet terminal 10 in the sequence diagram shown in FIG. 9.

The first user U1 who manages the first tablet terminal 10A, which is different from the second tablet terminal 10B, may want to read and view the setting information on a target patient even if he or she does not have the authority to edit the setting information on the target patient. In this case, the first tablet terminal 10A generates information (hereinafter, reading authority request information) for requesting authority to read the setting information on the target patient set in the modality 20 (hereinafter, reading authority) in the medical information management device 200 according to operation of the first user U1 (step S301). The first tablet terminal 10A transmits the generated reading authority request information to the medical information management device 200 (step S303).

The medical information management device 200, which has received the reading authority request information from the first tablet terminal 10A, determines whether or not to give the reading authority (step S305). Determination as to whether or not to give the reading authority may be performed in any manner. For example, if the reading authority is to be given only to doctors, it is determined whether or not to give the reading authority on the basis of whether the first user U1 is a doctor or the like.

As a result of determining whether or not to give the reading authority, the medical information management device 200 transmits reading authority information to the first tablet terminal 10A if it is determined that the reading authority is given and transmits denial information to the first tablet terminal 10A if it is determined that the reading authority is not given (Step S307). The memory 150 in the medical information management device 200 stores an authority management table. The authority management table is a table in which editing authority and reading authority for target patient setting information in a plurality of tablet terminals 10 are stored. The editing authority includes the reading authority, and a user U who has the editing authority also has the reading authority.

FIG. 11 is a diagram showing an example of details of the authority management table. The authority management table includes information on editing authority and reading authority associated with a terminal ID and a patient ID. For example, the authority management table includes information indicating that a tablet terminal 10 with a terminal ID "0001" has the reading authority for a patient ID "000A" and does not have any of the editing authority and the reading authority for patients with patient IDs "000B" and "000C." Since one tablet terminal 10 is managed by one user U, a user ID may be used instead of or in addition to a terminal ID.

The authority management table includes information indicating that a tablet terminal 10 with a terminal ID "0002" has the reading authority for patients with patient IDs "000A" and "000B" and has not any of the editing authority and the reading authority for a patient ID "000C." The editing authority for each patient ID is given to only one tablet terminal 10. The reading authority for each patient ID can be given to a plurality of tablet terminals 10.

Referring back to FIG. 10, the first tablet terminal 10A that has received the reading authority information or denial information notifies the first user U1 of the received information by displaying the information on the display 26, or the like (step S309). The first user U1 receives the notification from the first tablet terminal 10A and recognizes whether or not the reading authority has been given.

Subsequently, the first tablet terminal 10A transmits a reading destination confirmation request to the medical information management device 200 in order to confirm the modality (hereinafter, a reading destination) in which the setting information on the target patient has been set according to operation of the first user U1 (step S311). The medical information management device 200 that has received the reading destination confirmation request confirms the reading destination (step S313), generates reading destination information including information on the confirmed reading destination, and transmits the reading destination information to the first tablet terminal 10A (step S315).

Subsequently, the first tablet terminal 10A notifies the first user U1 of the reading destination included in the received reading destination information by displaying the reading destination information on the display 26, or the like (step S317). The first user U1 receives the notification from the first tablet terminal 10A and recognizes the reading destination for reading the setting information on the target patient.

Subsequently, the first tablet terminal 10A transmits a request to read the setting information on the target patient (hereinafter, a reading request) to the modality 20 that is the reading destination according to operation of the first user U1 (step S319). In response to the transmitted reading request, the modality 20 provides the setting information on the target patient (step S321) and transmits the setting information to the first tablet terminal 10A (step S323).

The first tablet terminal 10A notifies the first user U1 of the received setting completion information by displaying the setting completion information on the display 26, or the like (step S325). The first user U1 receives the notification from the first tablet terminal 10A and operates the first tablet terminal 10A to edit the setting information of the modality 20.

The first tablet terminal 10A generates editing information in response to the operation of the first user U1 (step S327) and transmits the generated editing information to the modality 20 (step S329). The modality 20 edits the setting information on the target patient on the basis of the editing information transmitted from the tablet terminal 10 (step S331). In this manner, the medical information management system 2 ends the sequence shown in FIG. 9. In this way, the medical information management system ends processing shown in FIG. 10.

The medical information management system of the third embodiment has the same effects as the medical information management system 2 of the second embodiment. Furthermore, the medical information management system of the third embodiment gives the reading authority to the tablet terminal 10. Therefore, even a user U who manages a tablet terminal 10 without editing authority can read and view the setting information on the target patient.

Fourth Embodiment

Next, a fourth embodiment will be described. A medical information management system of the fourth embodiment has the same configuration as the medical information management system 2 of the second embodiment and can execute the same processing as the medical information management system 2. The medical information management system of the fourth embodiment can execute the following processing in addition to the processing of the medical information management system 2 of the second embodiment. The fourth embodiment will be described below, focusing on the processing of the medical information management system of the fourth embodiment in addition to the processing of the medical information management system 2 of the second embodiment.

Figure 12:
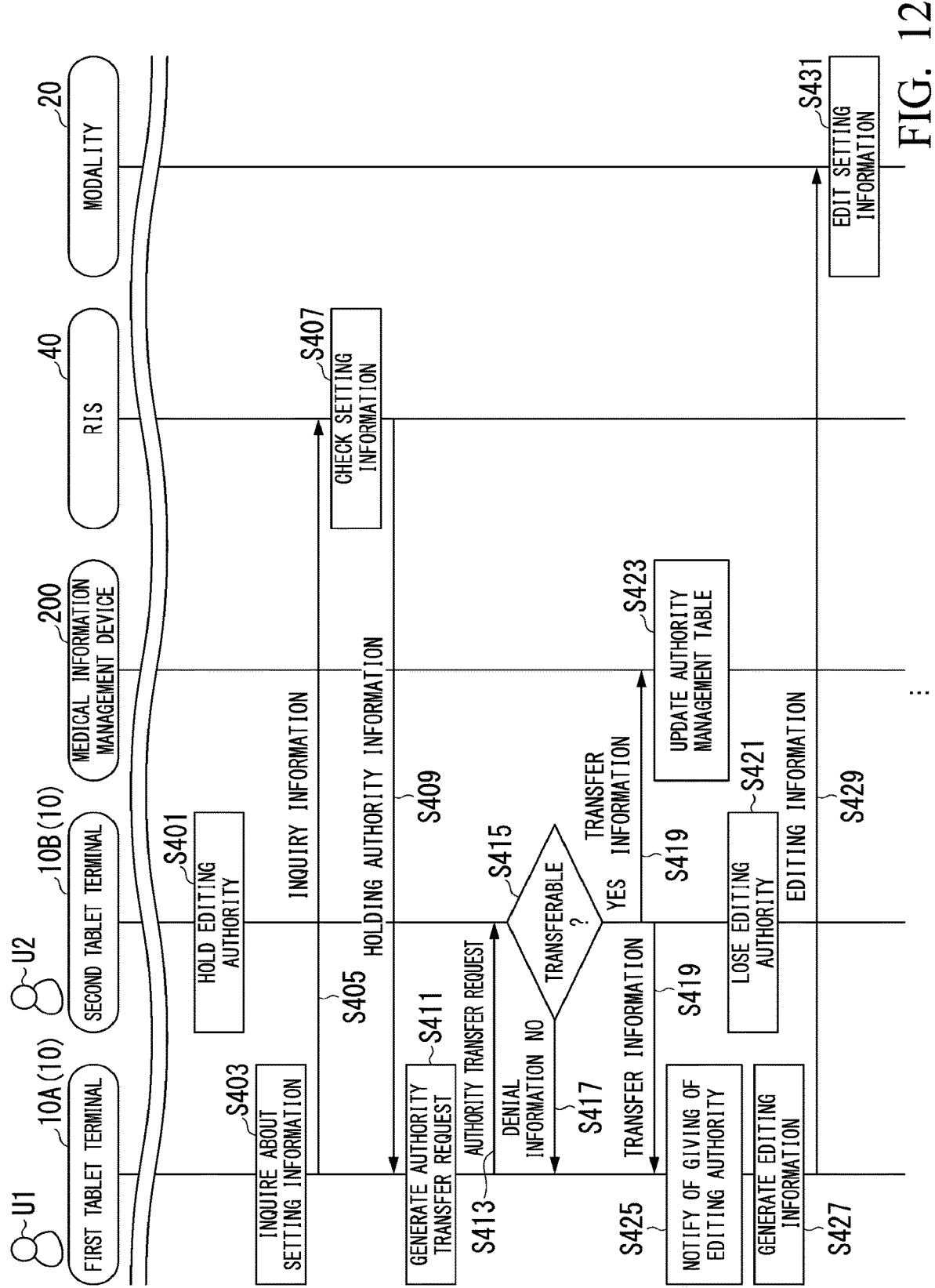
FIG. 12 is a sequence diagram showing an example of processing in a medical information management system of a fourth embodiment.

FIG. 12 is a sequence diagram showing an example of processing in the medical information management system of the fourth embodiment. The medical information management system of the fourth embodiment includes a first tablet terminal 10A and a second tablet terminal 10B as tablet terminals 10 and includes a medical information management device 200, an RIS 40, and a modality 20. In the sequence diagram shown in FIG. 12, the second tablet terminal 10B corresponds to the tablet terminal 10 in the sequence diagram shown in FIG. 9.

In the medical information management system of the fourth embodiment, the second tablet terminal 10B has the editing authority to edit setting information on a target patient in the modality 20 (step S401). The first user U1 who manages the first tablet terminal 10A without editing authority may find himself/herself in a situation where he/she wants to acquire editing authority depending on his/her own situation.

In this case, the first tablet terminal 10A generates inquiry information for inquiring the RIS 40 about the setting information set for the modality 20 to be used by the target patient according to operation of the first user U1 (step S403) and transmits the inquiry information to the RIS 40 (step S405). The RIS 40 that has received the inquiry information checks the setting information on the target patient according to the inquiry information (step S407) and transmits holding authority information indicating the tablet terminal 10 that holds editing authority for the target patient to the first tablet terminal 10A (step S409).

The first tablet terminal 10A that has received the holding authority information notifies the first user U1 of a user U indicated by the holding authority information, in this case, the second user U2 of the second tablet terminal 10B, by displaying the user U on the display 26, or the like. The first user U1 receives the notification from the first tablet terminal 10A, generates an authority transfer request for requesting transfer of the editing authority (step S411), and transmits the authority transfer request to the second tablet terminal 10B managed by the second user U2 (step S413).

The second tablet terminal 10B that has received the authority transfer request determines whether or not the editing authority can be transferred (step S415). The second tablet terminal 10B may determine whether or not the editing authority can be transferred in any manner. For example, the second tablet terminal 10B may display whether or not to allow transfer of the editing authority on the display 26 and determine whether the editing authority can be transferred on the basis of a result of selection made by the second user U2. Alternatively, the second tablet terminal 10B may assign conditions for permitting transfer authority to be granted to the user U in advance and determine whether the editing authority can be transferred depending on whether or not the first user U1 satisfies such conditions.

If it is determined that the editing authority cannot be transferred as a result, the second tablet terminal 10B generates denial information and transmits the denial information to the first tablet terminal 10A (step S417). The first tablet terminal 10A notifies the first user U1 that transfer of the editing authority has not been approved on the basis of the received denial information.

If it is determined that the editing authority can be transferred, the second tablet terminal 10B transmits transfer information to the medical information management device 200 and the first tablet terminal 10A (step S419). Thereafter, the second tablet terminal 10B loses the held editing authority (step S421). If the editing authority can be given to a plurality of tablet terminals 10, the second tablet terminal 10B may not lose the editing authority.

The acquisition function 141 in the medical information management device 200 acquires the transfer information transmitted by the second tablet terminal 10B. The acquisition function 141 updates the authority management table stored in the memory 150 on the basis of the acquired transfer information (step S423).

Figure 13:
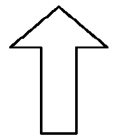
FIG. 13 is a diagram illustrating updating of the authority management table.

FIG. 13 is a diagram illustrating updating of the authority management table. As shown in the left diagram of FIG. 13, in the authority management table before being updated, editing authority for a target patient with a patient ID "000A" is set in the second tablet terminal 10B with the terminal ID "0002." Reading authority for the target patient with the patient ID "000A" is set in the first tablet terminal 10A with the terminal ID "0001."

On the other hand, as shown in the right figure of FIG. 13, in the updated authority management table, the editing authority is transferred, and thus the editing authority for the target patient with the patient ID "000A" is set in the first tablet terminal 10A with the terminal ID "0001." The reading authority set in the first tablet terminal 10A with the terminal ID "0001" is included in the editing authority. Further, the reading authority for the target patient with the patient ID "000A" is set in the second tablet terminal 10B with the terminal ID "0002." The reading authority for the target patient with patient ID "000A" in the second tablet terminal 10B with terminal ID "0002" may be deleted.

Referring back to FIG. 12, the first tablet terminal 10A that has received the transfer information notifies the first user U1 that the editing authority has been transferred by displaying it on the display 26, or the like (step S425). The second tablet terminal 10B generates editing information in response to the operation of the first user U1 (step S427) and transmits the generated editing information to the modality 20 (step S429). The modality 20 edits the setting information on the target patient on the basis of the editing information transmitted by the first tablet terminal 10A (step S431). In this manner, the medical information management system of the fourth embodiment ends the sequence shown in FIG. 12.

The medical information management system of the fourth embodiment has the same effects as the medical information management system 1 of the first embodiment. Furthermore, the medical information management system of the fourth embodiment can transfer editing authority to edit setting information to another user U. Therefore, the convenience of users U can be improved.

Although the tablet terminal 10 directly transmits the authority transfer request to another tablet terminal 10 in the embodiment described above, the tablet terminal 10 may transmit the authority transfer request to the medical information management device 200 such that the authority transfer request is transmitted to another tablet terminal 10 via the medical information management device 200. In this case, the authorization function in the medical information management device 200 transfers the editing authority given to the tablet terminal to another tablet terminal. Further, although the medical information management device 200 is provided independently of the RIS 40 in the embodiment described above, the medical information management device may be provided within the RIS 40.

According to at least one embodiment described above, it is possible to prevent a modality to be operated from being misidentified by including an acquisition unit configured to acquire patient authentication data for identifying a patient, provided by a terminal device managed by a user, an authentication unit configured to authenticate that the patient is a user of a medical image diagnostic device on the basis of the patient authentication data, and an authorization unit configured to give the terminal device an editing authority to edit setting information on the patient set to examine the patient by the medical image diagnostic device on the basis of a result of the authentication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical information management system, comprising:
   a medical information management device;
   a schedule management device;
   a plurality of terminal devices; and
   a plurality of medical image diagnostic devices,
   wherein the medical information management device comprises processing circuitry configured to:
      acquire patient authentication data for identifying a patient from a terminal device managed by a user,
      authenticate that the patient is a user of a medical image diagnostic device on the basis of the patient authentication data, and
      give the terminal device an editing authority to edit setting information set to examine the patient by the medical image diagnostic device on the basis of a result of the authentication,
   wherein the schedule management device includes circuitry configured to manage work schedules of the user and the plurality of medical image diagnostic devices,
   wherein the processing circuitry of the medical information management device is further configured to select the medical image diagnostic device to be used for examination of the patient from among the plurality of medical image diagnostic devices, and
   the circuitry of the schedule management device is further configured to transmit the work schedules to the medical image diagnostic device in response to a request from the selected medical image diagnostic device.

2. The medical information management system according to claim 1, wherein the processing circuitry is further configured to select the medical image diagnostic device to be used for examination of the patient from among the plurality of medical image diagnostic devices.

3. The medical information management system according to claim 1, wherein the processing circuitry is further configured to give the terminal device a reading authority to read the setting information set in the medical image diagnostic device.

4. The medical information management system according to claim 3, wherein the processing circuitry is configured to give the reading authority to the terminal device in response to a request from the terminal device.

5. The medical information management system according to claim 1, wherein the processing circuitry is configured to acquire transfer information indicating that the editing authority has been transferred from the terminal device to another terminal device.

6. The medical information management system according to claim 1, wherein the processing circuitry is configured to transfer the editing authority given to the terminal device to another terminal device.

7. A terminal device used in a medical information management system comprising a medical information management device and a plurality of medical image diagnostic devices,
- wherein the medical information management device comprises processing circuitry configured to:
  - acquire patient authentication data for identifying a patient from a terminal device managed by a user,
  - authenticate that the patient is a user of a medical image diagnostic device on the basis of the patient authentication data, and
  - give the terminal device an editing authority to edit setting information set to examine the patient by the medical image diagnostic device on the basis of a result of the authentication,
- the terminal device comprising:
- circuitry configured to
  - read the patient authentication data for identifying the patient,
  - transmit the patient authentication data to the medical information management device,
  - receive editing authority information transmitted by the medical information management device and notify that the editing authority to edit the setting information set in the medical image diagnostic device is given, and
  - generate editing information for editing the setting information set in the medical image diagnostic device and transmit the generated editing information to the medical image diagnostic device.

8. A computer-readable non-transitory storage medium used in a medical information management system comprising:
- a medical information management device,
- a schedule management device,
- a plurality of terminal devices, and
- a plurality of medical image diagnostic devices,
- wherein the storage medium stores a program causing a computer of the medical information management device to:
- acquire patient authentication data for identifying a patient from a terminal device managed by a user;
- authenticate that the patient is a user of a medical image diagnostic device on the basis of the patient authentication data; and
- give the terminal device an editing authority to edit setting information set to examine the patient by the medical image diagnostic device on the basis of a result of the authentication,
- wherein the schedule management device includes circuitry configured to manage work schedules of the user and the plurality of medical image diagnostic devices,
- wherein the program further causes the computer to select the medical image diagnostic device to be used for examination of the patient from among the plurality of medical image diagnostic devices, and
- wherein circuitry of the schedule management device is further configured to transmit the work schedules to the medical image diagnostic device in response to a request from the selected medical image diagnostic device.

* * * * *